United States Patent [19]

Mills et al.

[11] Patent Number: 4,821,769

[45] Date of Patent: Apr. 18, 1989

[54] VALVE MONITOR AND METHOD

[75] Inventors: Gary N. Mills, Gladstone; Bruce A. Peterson, Milwaukie; William G. Preston, Jr., Portland, all of Oreg.

[73] Assignee: CD Medical Inc., Miami Lakes, Fla.

[21] Appl. No.: 929,981

[22] Filed: Nov. 12, 1986

[51] Int. Cl.⁴ ............................................. F16K 37/00
[52] U.S. Cl. ..................... 137/554; 73/49.8; 73/592; 73/600; 340/605; 340/608
[58] Field of Search ................ 137/554; 73/46, 49.8, 73/592, 600; 340/603, 605, 607, 608

[56] References Cited

U.S. PATENT DOCUMENTS

| | | | |
|---|---|---|---|
| 2,552,088 | 5/1951 | Davis | 177/311 |
| 2,786,661 | 3/1957 | Herzog et al. | 262/3 |
| 2,922,103 | 1/1960 | Smith | 324/2 |
| 3,417,329 | 12/1968 | Landis et al. | 324/62 |
| 3,548,304 | 12/1970 | Lohnes | 324/65 |
| 3,890,995 | 6/1975 | Miller et al. | 137/554 X |
| 3,896,373 | 7/1975 | Zelby | 324/57 R |
| 3,938,544 | 2/1976 | Bernaerts | 73/46 X |
| 3,993,247 | 11/1976 | Tyler | 137/554 X |
| 4,183,467 | 1/1980 | Sheraton et al. | 137/554 X |
| 4,340,086 | 7/1982 | Hemm et al. | 137/554 |
| 4,376,450 | 3/1983 | Fayfield et al. | 137/554 |
| 4,411,651 | 10/1983 | Schulman | 604/151 |
| 4,607,254 | 8/1986 | Carlson | 340/606 |

FOREIGN PATENT DOCUMENTS

| | | | |
|---|---|---|---|
| 3512533 | 10/1986 | Fed. Rep. of Germany | 137/554 |
| 2240437 | 4/1975 | France . | |
| 01324682 | 10/1981 | Japan | 137/554 |
| 0068581 | 4/1983 | Japan | 137/554 |
| 0013176 | 1/1984 | Japan | 137/554 |
| 0017079 | 1/1984 | Japan | 137/554 |
| 0057085 | 4/1985 | Japan | 137/554 |
| 0192235 | 9/1985 | Japan | 73/592 |

*Primary Examiner*—John Rivell

[57] ABSTRACT

A method and apparatus for monitoring operation of a valve is disclosed in which a signal, such as an alternating current electrical signal, is propagated through a fluid path defined by the valve. The occlusion of the fluid path is indicated by monitoring the propagation of the signal. The system is highly immune to electrical noise and to variations in fluid conductivity. The system is also well adapted for monitoring operation of valves having a plurality of ports. In installations employing a plurality of valves, as plurality of valve monitors can be used without mutual interference.

18 Claims, 2 Drawing Sheets

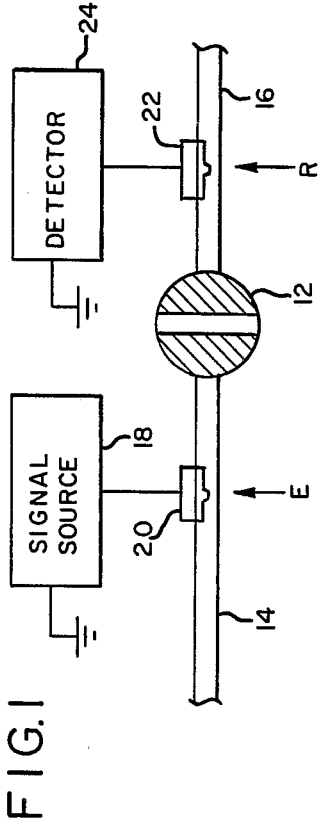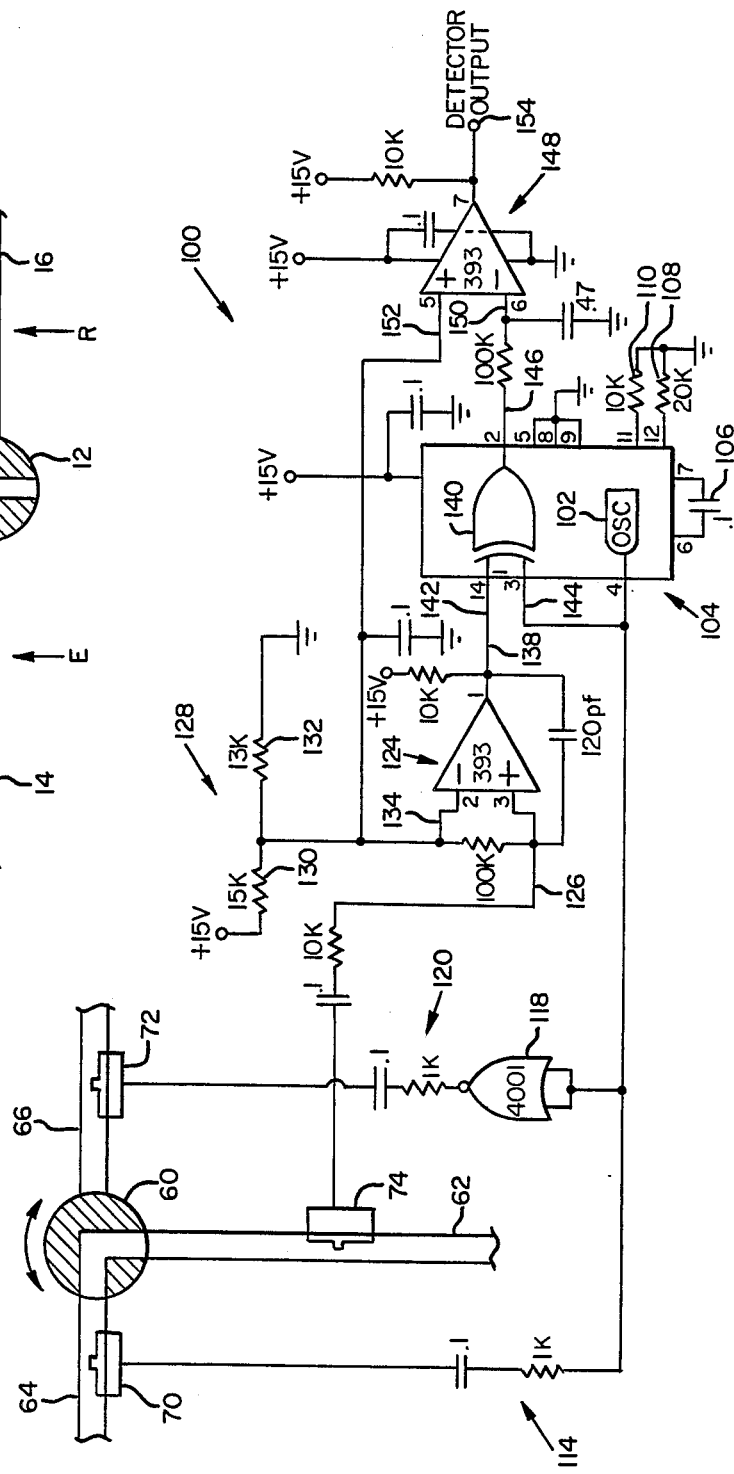

VALVE MONITOR AND METHOD

TECHNICAL FIELD

The present invention relates to valve monitors, and more particularly to an electronic apparatus and method for monitoring the occlusion of a fluid path caused by a valve in the path.

BACKGROUND OF THE INVENTION

Valves are used in a multitude of applications to control the passage of fluids. In some applications, such as biomedical equipment and chemical process control equipment, human lives can be endangered if a valve fails during operation. Failures may include a failure to actuate, a failure to deactuate or a failure caused by leaks in and around the valve.

A number of techniques are known in the prior art to monitor the operation of a valve. One technique is to include an electromechanical sensor in the valve housing to detect the movement of the flapper between its open and closed positions. Such electromechanical sensors often comprise switches that are operated by the movement of the valve flapper and produce an on or off signal indicating the position of the valve flapper and correspondingly the state of the valve.

Electromechanical valve monitoring systems suffer from a number of drawbacks. One is the poor reliability of switch mechanisms. Virtually all switches have a finite lifetime. When the switch fails, operation of the valve monitor ceases. There is generally no method for detecting switch failure except by making frequent redundant checks of the valve's state.

Another drawback to electromechanical monitoring systems is that they generally do not indicate the relative degree of valve closure: the sensing switch is either on or off, without any provision for indicating a partial opening or closure. In many applications, any opening of a valve, regardless of how minute, can be critical to the operation of a system.

Finally, electromechanical monitoring systems suffer in that they cannot detect leaks through or around a valve flapper, by which fluid from the inlet might communicate with fluid in the outlet.

Examples of electromechanical valve monitors are shown in U.S. Pat. Nos. 4,340,086 and 4,376,450.

In another class of valve monitors, a visual indication of the valve status is produced. In such monitors, an indicator external to the valve housing changes position with the valve flapper, signaling to the operator the state of the valve. Although some of the reliability problems associated with other monitoring systems are eliminated by this approach, it nonetheless suffers from poor resolution of intermediate flapper positions and is unable to detect leaks around the valve.

To detect leaks around a valve, it has generally been necessary to conduct a static pressure test. In such a test, a pressure is applied to the valve in its closed state and the decay of this pressure over time is monitored. The rate at which the pressure decays indicates the relative leak rate of the valve.

The static pressure test suffers from a number of obvious drawbacks. First is that several extraneous components, not generally included in the system being tested, must be provided in order to apply the static pressure to the valve and to measure the resultant pressure decay. Another drawback is that the test is conducted at a time and under a set of conditions isolated from the valve's normal operation. The method cannot be used to check leakage during actual operation. Finally, the test circumstances rarely duplicate actual dynamic operating conditions and thus are a poor predictor of valve performance during normal operation.

Yet another technique for monitoring valve operation is to monitor with a flow meter the rate of fluid flow through the valve. This technique, however, relies on the proposition that the pressure driving the fluid is constant, so that any variation in flow must be caused by changes in the valve. The flow meter technique is also ill-suited to detect the minute fluid flows associated with most valve leaks.

From the foregoing it will be recognized that the current state of the art in valve monitors is deficient in several respects. There is no convenient technique for determining leakage through a closed valve while it is in operation. Similarly, there is no convenient technique for monitoring the status of a valve in its partially opened or closed state. Finally, prior art techniques suffer from a host of reliability problems that make them fraught with risk for use in sensitive biomedical and chemical process control applications.

Accordingly, a need remains for an improved method and apparatus for monitoring the operation of a valve.

SUMMARY OF THE INVENTION

It is an object of the present invention to provide an improved valve monitor and method.

It is another object of the present invention to determine the relative degree of occlusion presented to a fluid path by a valve.

It is still another object of the present invention to detect leaks through and around a valve during its normal operation.

It is yet another object of the present invention to render an electronic valve monitor relatively immune from the effects of interfering electrical noise.

It is yet another object of the present invention to provide a simple electronic valve monitor which couples indirectly to fluid routed through a valve.

It is still another object of the present invention to provide an electronic valve monitor which couples directly to fluid routed through a valve at only two points.

It is yet another object of the present invention to electronically monitor operation of a three way valve.

It is still another object of the present invention to enable a plurality of valve monitors to operate simultaneously within the same hydraulic system.

It is yet another object of the present invention to render an electronic valve monitor immune to variations in the resistance of fluid in the system.

It is yet another object of the present invention to achieve the foregoing objects with a high degree of reliability.

The foregoing and additional objects, features and advantages of the present invention will be more readily apparent from the following detailed descriptions of preferred embodiments thereof, which proceed with reference to the accompanying drawings.

BRIEF DESCRIPTION OF THE DRAWINGS

FIG. 1 shows a "two point" embodiment of the present invention as used with a two-way valve.

FIG. 5 is an electrical schematic diagram of a signal source and detector circuit that can be used with the valve monitors of FIGS. 2 and 4.

DESCRIPTION OF PREFERRED EMBODIMENTS

Two Point Embodiment

Figure 3:
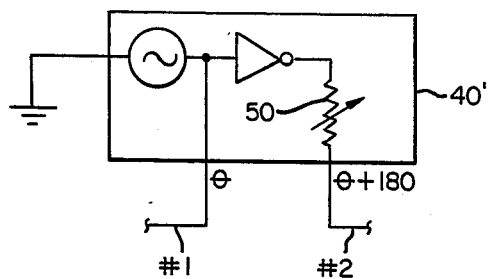
FIG. 3 shows a signal source suitable for use with the "three point" embodiment of the invention illustrated in FIG. 2.

FIG. 1 shows the application of a "two point" embodiment of the present invention to a two-way valve 12. Valve 12 controllably links a first fluid conduit 14 to a second fluid conduit 16, thereby forming a fluid path therebetween. A signal source 18 provides an excitation signal through an excitation coupling apparatus 20 to the fluid at a point "E" in first conduit 14. A resultant signal is coupled from the fluid at a point "R" in second conduit 16 through a resultant coupling apparatus 22 and is provided to a detector 24. Detector 24 monitors a characteristic of the resultant signal that varies with the occlusion of valve 12, such as the resultant signal's phase or amplitude, thereby enabling the state of valve 12 to be determined.

Signal source 18 can provide any of a variety of signals, such as direct current signals, alternating current signals, radio frequency signals, acoustical signals or optical signals, to excitation coupling apparatus 20. Coupling apparatus 20 and coupling apparatus 22 in turn can couple these signals to and from the fluid using a variety of techniques. They can couple electrical signals using either direct electrical contact or indirect electromagnetic coupling. Direct electrical contact can be effected by means as simple as a stainless steel screw threaded into a hole in the side of the conduit. Indirect electromagnetic coupling can be effected by a conductor coiled adjacent to the conduit or by an antenna mounted within it. In the case of inductive coupling by coiled conductors, a closed flux path should be provided which pass through the valve and to which the coiled conductors can couple. The closing of the flux path can be effected by a variety of means, such as a ferromagnetic material coupling the remote ends of the coiled conductors together, or merely by stray coupling to a steel case which may enclose the hydraulic system. In any event, the reluctance presented to the flux path by the valve in its closed state should be a significant part of the total path reluctance.

In still other embodiments, acoustical signals can be coupled to and from the fluid using electromechanical transducers for coupling apparatuses 20, 22. In yet other embodiments, optical signals can be coupled to and from the fluid using photodiodes and photodetectors.

Detector 24 can be designed to detect and monitor any of a number of characteristics of the resultant signal which may be influenced by the state of valve 12, such as amplitude or phase. These characteristics can be detected in several different manners. Detector 24 can, for example, detect relative changes in the monitored characteristic of the resultant signal, which changes are indicative of relative changes in the occlusion between conduits 14 and 16. Alternatively, detector 24 can detect differences between the monitored characteristic of the resultant signal and a corresponding characteristic of a reference signal. In still other embodiments, detector 24 can simply detect the absolute value of a characteristic of the resultant signal, which value again is indicative of the degree of occlusion between conduits 14 and 16.

In an illustrative embodiment, signal source 18 provides a 1,000 Hertz, 5 volt electrical signal to the fluid in conduit 14 through a metal screw tapped into the conduit. Detector 24, which shares a common ground with signal source 18, detects the magnitude of the resultant signal coupled from the fluid by resultant coupling apparatus 22. The input impedance of detector 24 is selected so that the open and closed impedances through valve 12 are comparatively low and high, respectively.

The magnitude of the resultant signal detected by detector 24 is dependent upon the resistance of the fluid path through which the signal is propagating. This resistance is in turn dependent on the state of valve 12. When valve 12 is in the "OFF" state illustrated, the resistance through the fluid path is high, due to the interruption of the fluid path by the valve, so the magnitude of the resultant signal detected by detector 24 is low. Correspondingly, when valve 12 is in the "ON" state, the resistance through the fluid path will be minimized due to the completion of the fluid path through valve 12, so the magnitude of the signal detected by detector 24 will be high. Intermediate states of valve 12 between the fully "ON" and fully "OFF" states will yield correspondingly intermediate resultant signals.

If the composition of the fluid is constant, so that its unit resistance per cross-sectional area is time-invariant, the state of valve 12 can be directly correlated to the magnitude of the resultant signal. In a simple embodiment, this can be effected by an analog comparator circuit included in detector 24 which compares the magnitude of the resultant signal with that of a threshold reference signal. If the magnitude of the resultant signal is less than that of the reference signal, the valve is considered to be in its "OFF" state. If greater, the valve is considered to be in its "ON" state. This same arrangement can be adapted to detect valve openings or closures greater than any predetermined degree by setting the threshold reference signal accordingly.

In more sophisticated versions, the correlation between the state of valve 12 and the magnitude of the resultant signal is made by a microprocessor based system. In such system, the resultant signals corresponding to a multitude of known valve states are profiled and stored in a microprocessor memory. Thereafter, resultant signals are correlated to those stored in memory and the precise state of the valve read directly therefrom, or by interpolation between stored states.

In still other systems, an equation is derived to relate the degree of occlusion presented to the fluid path by the valve to the magnitude of the resultant signal. This equation is then solved to correlate particular resultant signal magnitudes to corresponding valve states.

Although the illustrated, "two point" embodiment of the invention is a simple, effective approach to many valve monitoring applications, additional advantages can be obtained by related "three point" embodiments.

First Three Point Embodiment

Figure 2:
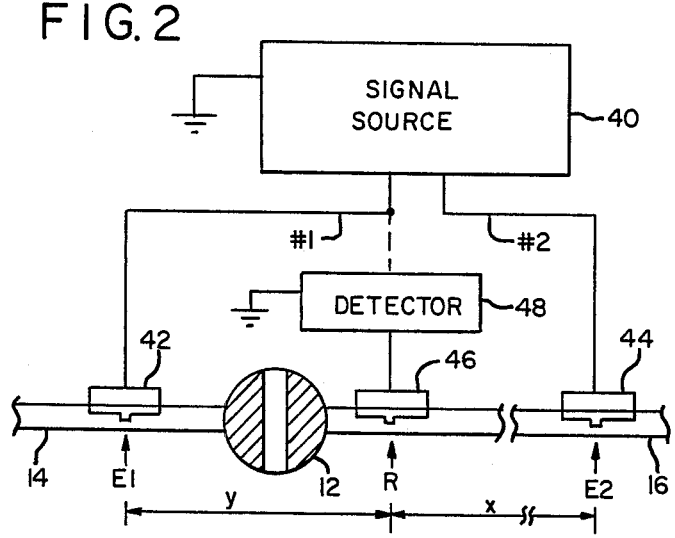
FIG. 2 shows a "three point" embodiment of the present invention as used with a two-way valve.

FIG. 2 shows the application of a "three point" embodiment of the present invention to a two-way valve. In this embodiment, a signal source 40 provides excitation signals to first and second excitation coupling apparatuses 42, 44. Coupling apparatus 42 couples a first excitation signal to the fluid in conduit 14 at a location "E1" spaced relatively near valve 2. Coupling apparatus 44 couples a second excitation signal to the fluid in conduit 16 at a location "E2" spaced relatively far from valve 12. Resultant coupling apparatus 46 couples a resultant signal from conduit 16 at a location "R" between excitation coupling apparatus 44 and valve 12.

The resultant signal in this three point embodiment is formed by the superposition of the first and second excitation signals after they have propagated to resultant coupling apparatus 46. The influence of the first excitation signal is variable, dependent primarily on the isolation provided by valve 12 between locations "E1" and "R" and dependent secondarily on the distance "Y" between these locations. The influence of the second excitation signal is fixed, dependent primarily on the distance "X" separating locations "R" and "E2".

In a simple exemplary embodiment, the first excitation signal applied to first conduit 14 at location "E1" is ten volts and the second excitation signal provided to second conduit 16 at location "E2" is five volts. When valve 12 is in its illustrated "OFF" state, the magnitude of the resultant signal at location "R" will be substantially equal to the magnitude of the second excitation signal applied at location "E2". If, however, valve 12 is switched to its "ON" state, the resultant signal at location "R" will have a higher magnitude, somewhere between that of the first and second excitation signals, dependent primarily upon the ratio of the distances separating location "R" from locations "E1" and "E2." If the distance "X" separating location "R" from "E2" is four times the distance "Y" separating location "R" from "E1", the resultant signal will have a magnitude approximately four-fifths of the way from five volts to ten volts, or nine volts. This voltage is detected by a detector circuit 48 and monitored to determine the state of valve 12. This approach relies on a voltage divider concept and is thus independent of fluid conductivity.

In some hydraulic systems, the composition of the fluid varies as valves within the system are switched. In such cases, the unit resistance of the fluid per cross-sectional area is not time-invariant, so some amplitude based monitoring systems are difficult to implement. In these and other systems, phase based monitoring systems can be employed.

In a phase based monitoring system, a signal generator 40' (FIG. 3) can be employed which provides first and second excitation signals which are 180 degrees out of phase relative to one another. In operation of such a system, the first excitation signal, having a phase theta, is applied to first excitation coupling apparatus 42 (FIG. 2). The second excitation signal, having a phase of theta plus 180 degrees, is applied to second excitation coupling apparatus 44. If valve 12 is in its "OFF" state, the resultant signal coupled from conduit 16 by coupling apparatus 46 will have a phase matching that of the second excitation signal: theta plus 180 degrees. If, however, valve 12 is in its "ON" state, the first excitation signal will predominate at resultant coupling apparatus 46 due to the relatively shorter propagation path, and consequently lower path resistance, so the resultant signal coupled from location R will have a phase theta.

In such phase based systems, detector 48 can be a phase detector which compares the phase of the resultant signal to a reference signal. This reference signal is related in a known way to the first and second excitation signals and can, for example, be the first excitation signal itself. In such an embodiment, detector 48 compares the resultant signal to the first excitation signal. If the phase of the resultant signal is 180 degrees out of phase with the first excitation signal, valve 12 is known to be "OFF." If the phase of the resultant signal is the same as the phase of the first excitation signal, valve 12 is known to be "ON."

In the above described system, the predominance of the second excitation signal over the first when the valve is in its "ON" state is due to the relatively shorter path "Y" compared to path "X." Since the second excitation signal must propagate through a much longer fluid path, its influence at resultant coupling apparatus 46 is diminished relative to that of the first excitation signal. Consequently, the first excitation signal entirely cancels the second excitation signal at the resultant coupling apparatus, thereby producing a net, resultant signal having a phase matching that of the first signal.

In other embodiments, excitation coupling apparatuses 42 and 44 can be spaced equally about resultant coupling apparatus 46 and the same diminution of the second excitation signal relative to the first can be achieved by proper design of signal source 40'. As shown in FIG. 3, the second excitation signal can be electronically attenuated by an attenuator 50 which is included in signal source 40'. In such embodiment, when valve 12 is "OFF," the second excitation signal applied to second coupling apparatus 44, although attenuated, is still predominant at resultant coupling apparatus 46. Detector 48 consequently detects a resultant phase matching that of the second excitation signal. If, however, valve 12 is turned to its "ON" state, the first excitation signal (of greater magnitude) is predominant at coupling apparatus 46 and causes detector 48 to detect a resultant phase matching that of the first excitation signal.

While the above discussion has centered on a system for simply determining whether a valve is "ON" or "OFF," the same system can be adapted to detect leaks through or around a valve. In such systems, excitation coupling apparatuses 42 and 44 can again be spaced equidistantly about coupling apparatus 46. However, attenuator 50 is in these instances set to greatly attenuate the second excitation signal below the first, for example, a thousand-fold reduction. In operation, if valve 12 is "OFF," the isolation provided by valve 12 between locations "E1" and "R" is sufficient so that the attenuated signal from remote location "E2" will predominate over the stronger signal from location "E1" when these signals are superimposed at resultant coupling apparatus 46. If, however, even a small leak allows fluid to communicate through or around valve 12, the greatly stronger signal originating from location "E1" and leaking through the valve will swamp the attenuated signal originating from location "E2" t resultant coupling apparatus 46. By varying the attenuation of attenuator 50, and consequently the relative weightings of the first and second excitation signals, a threshold can be set above which the detector will signal a leak.

One advantage afforded by phase detector based monitoring systems, such as described above, over amplitude based systems is that several different valve monitoring systems sharing a common reference ground, operating at several different frequencies, can be employed within a single hydraulic system without mutual interference. Another advantage of phase based monitoring systems is that they are essentially immune to electrical noise, such as may be coupled from power wiring, which would otherwise interfere with system operation.

Second Three Point Embodiment

Figure 4:
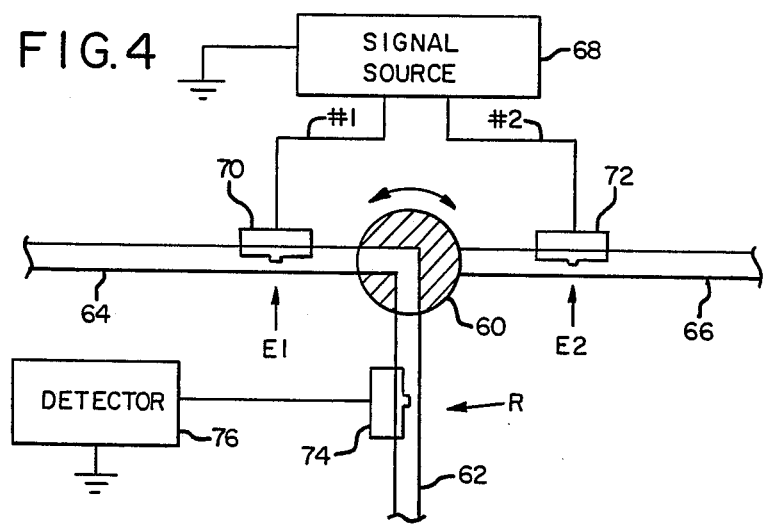
FIG. 4 shows a "three point" embodiment of the present invention as used with a three-way valve.

FIG. 4 shows a "three point" embodiment of the present invention applied to a three-way valve 60. In this embodiment, valve 60 controllably couples a second, common conduit 62 to first and third switched conduits 64, 66. Three way valve 60 is illustrated as coupling common conduit 62 to first conduit 64, but can be rotated so as to couple common conduit 62 to second conduit 66. A signal source 68 again provides first and second excitation signals. The first excitation signal is coupled to the fluid in first conduit 64 at a location "E1" by a first excitation coupling apparatus 70. The second excitation signal is coupled to the fluid in third conduit 66 at a location "E2" by a second excitation coupling apparatus 72. A resultant signal is coupled from the fluid in second conduit 62 by a resultant coupling apparatus 74. The resultant signal is again coupled to a detector 76 which monitors the signal for a characteristic indicative of the state of valve 60.

In an exemplary embodiment, signal source 68 can again provides first and second excitation signals Which are 180 degrees out of phase relative to one another. When these signals are applied to the illustrated system, the first excitation signal, coupled to conduit 64, will predominate at resultant coupling apparatus 74 in conduit 62 by virtue of the fluid path provided between these conduits by valve 60. If the position of valve 60 is changed so as to provide a fluid path between conduit 66 and 62, the second excitation signal, applied to second coupling apparatus 72, will predominate at resultant coupling apparatus 74. Detector 76 in this exemplary embodiment compares the resultant signal to the first excitation signal and determines from the result of this comparison whether conduit 62 is coupled to conduit 64 or 66 through valve 60.

As discussed above in connection with the FIG. 2 embodiment, the FIG. 4 embodiment can also be designed to detect leaks of any magnitude across valve 60 by appropriate relative weighting of the first and second excitation signals.

Phase Detector Circuit

FIG. 5 shows the preferred embodiment of a combination signal source and phase detector circuit 100 that can be employed in the three point embodiments illustrated in FIGS. 2 and 4. A three way valve system of the type shown in FIG. 4 is shown for illustrative convenience.

The signal source illustrated in circuit 100 is the oscillator section 102 of a CD4046 phase-locked loop circuit 104. Oscillator section 102 generates an excitation signal at a frequency dependent on the values of timing capacitor 106 and resistors 108, 110. In the illustrated embodiment, these timing components have been selected to produce an excitation signal frequency of approximately one kilohertz. The excitation signal from oscillator 102 is applied to first excitation coupling apparatus 70 directly through an RC circuit 114. The excitation signal is applied to second excitation coupling apparatus 72 through an inverter stage 118 and an RC circuit 120, thus producing a second excitation signal 180 degrees out of phase with the first. The resultant signal is coupled from the fluid in conduit 62 by resultant coupling apparatus 74.

The resultant signal coupled from the fluid by resultant coupling apparatus 74 will usually be somewhat lower in amplitude than the excitation signals, due to resistive losses in the fluid. In order for an accurate evaluation of the resultant signal to be made, it is desirable to first amplify the resultant signal back up to the level of the excitation signals. This amplification is effected by comparator 124.

Comparator 124 is configured as a threshold detector, switching its output 138 to logic high (15 volts) or logic low (0 volts) depending on whether the resultant signal applied to its input 126 is above or below a reference voltage. In the illustrated embodiment, the reference voltage is 6.9 volts and is derived by a voltage divider circuit 128 from the circuit's 15 volt supply voltage by operation of resistors 130 and 132. If the resultant signal applied to input 126 is greater than the reference voltage applied to input 134, the output 138 of operational amplifier 124 will go to logic high, or 15 volts. If the resultant signal applied to input 126 is less than the reference voltage, output 138 of operational amplifier 124 will go to logic low, or zero volts. By this technique, the voltage swing of the resultant signal is restored to the 15 volt swing of the excitation signals.

The restored resultant signal from operational amplifier 124 is compared to the excitation signal from oscillator 102 by a phase comparator 140 within phase-locked loop circuit 104. The resultant signal from operational amplifier 124 is applied to input 142 of phase comparator 140 and the excitation signal from oscillator 102 is applied to input 144. Phase comparator 140 produces an output signal on output line 146 with an average value proportional to the phase difference between the signals applied at inputs 142 and 144. If the input signals are in phase, indicating that valve 60 is coupling conduit 62 to conduit 64, output line 146 goes to logic low, or 0 volts. If inputs 142 and 144 are 180 degrees out of phase, indicating that valve 60 is coupling conduit 62 to conduit 66, output line 146 goes to logic high, or 15 volts. If for some reason the resultant signal is lost and goes to a DC value, the average value of the signal on output line 146 goes to 7.5 volts.

The illustrated circuit 100 includes one more stage after phase comparator 140 to resolve the problem of the 7.5 volt indeterminate logic signal produced if the resultant signal is lost. This additional stage is another threshold detector circuit 148 that compares the output from phase comparator 140, applied to input 150, with the reference voltage of 6.9 volts, applied to input 152. If the phase comparator output applied to input 150 is 7.5 volts, amplitude comparator 148 will transform it to a logic low signal at the detector output 154. If the phase comparator output is logic high or low, amplitude comparator 148 acts as an inverter and produces logic low or high signals, respectively, at detector output 154.

If valve 60 is in the position illustrated, coupling conduits 64 and 62, the resultant signal will be in phase with the oscillator signal. Consequently, the signal detector output 154 will be logic high. Conversely, if valve 60 is in the opposite position, coupling conduit 66 and 62, the resultant signal will be 180 degrees out of phase with the oscillator signal. Consequently, the signal at detector output 154 will be logic low. Thus, detector output 154 of circuit 100 provides a signal indicative of the state of valve 60.

If a valve failure or other undesired operation is detected by circuit 100, the signal at detector output 154 can be used to drive appropriate logic circuitry to shut the system down or take other corrective measures.

Gaseous Systems

In alternative embodiments of the present invention using electrical signals, valves that control gases, rather than liquids, are monitored. In such systems, the electrical resistivity of the gas is generally too high to permit its use as a conductor of an electrical signal. In this event, an electrical signal such as a microwave signal is electromagnetically propagated inside the conduit through the gas and to the valve. The coupling apparatuses illustrated in the above described embodiments here comprise antennas, typically positioned within the conduits, which couple signals to and from the gaseous system.

Transceiver Based Systems

In still other systems, it is not necessary that the signal be coupled from the conduit at a location remote from where it is coupled to the conduit. Instead, a transceiver-like device can be employed at a single point to both excite the fluid and to receive the resultant response. In one such exemplary system, an acoustic wave is coupled to the conduit and caused to propagate toward the valve. The receiver section of the transceiver then monitors the amplitude or phase of the returning signal. If the valve fully occludes the channel, the returning signal will be strong and quickly returned. If the valve is open, the excitation signal will propagate further into the system and will thus be weaker and perhaps fragmented when it is ultimately reflected and returned to the receiver.

When applied to the FIG. 1 embodiment, signal source 18 includes the functions of detector 24 together with associated transmit/receive switching circuitry. When applied to the FIG. 4 embodiment, coupling apparatuses 70 and 72 can each be coupled to a signal source 68 which includes the functions of detector 76 and associated transmit/receive switching. Coupling apparatus 74 can then be omitted.

Resonance Based Systems

In still other embodiments of the present invention, a conduit within a hydraulic system is excited with a spectrum of electromagnetic signals. The corresponding received signal, either at a remote location or at the same location as the excitation, has a resultant spectral power distribution dependent upon the resonant frequency of the conduit being excited. The resonant frequency of the conduit, in turn, will depend on the occlusion of the conduit caused by the valve.

In an exemplary embodiment, the cavity defined by conduits 14, 16 and valve 12 in FIG. 1 is excited by a signal source 18 which operates as a swept frequency generator or a wideband noise generator. The resultant signal coupled by coupling apparatus 22 is then analyzed by detector 24 for resonant peaks within the swept spectrum. These resonant peaks are then correlated to the state of the valve.

From the foregoing description, it will be recognized that the present invention has applicability beyond the monitoring of one valve. The invention can be utilized to determine the relative occlusion of any fluid path, regardless of its length or complexity.

It will further be recognized that if the excitation signals coupled to the fluid are electrical, the valve must be capable of providing electrical isolation between its ports. Accordingly, metal valves are unsuitable. If the excitation signals are optical or acoustical, this limitation does not apply.

Having described and illustrated the principles of our invention in several embodiments, it should be apparent to those skilled in the art that the invention can be modified in arrangement and detail without departing from such principles. We claim all modifications coming within the scope and spirit of the following claims.

We claim:

1. An apparatus for monitoring operation of a three way valve linking a common conduit to first and second conduits in a fluid system, comprising:
    signal source means for providing first and second alternating current signals of a first frequency, said signals being out of phase with one another;
    first excitation coupling means for coupling the first alternating current signal from the signal source means to the fluid in the first conduit so that the first alternating current signal can propagate therealong;
    second excitation coupling means for coupling the second alternating current signal from the signal source means to the fluid in the second conduit so that the second alternating current signal can propagate therealong;
    resultant coupling means for coupling a resultant signal from the fluid in the common conduit, said resultant signal being the superposition of the first alternating current signal, after its propagation to the resultant coupling means, with the second alternating current signal, after its propagation to the resultant coupling means;
    reference means for providing a reference alternating current signal at said first frequency; and
    detector means coupled to the resultant coupling means and to the reference means for comparing the phase of the resultant signal with the phase of the reference signal and producing an output signal therefrom, said output signal being indicative of the state of the three way valve.

2. An apparatus according to claim 1 in which he signal source means provides first and second alternating current signals of different magnitudes, whereby the superposition of said signal at the resultant coupling means is weighted so as to facilitate detection of leaks through the valve.

3. A hydraulic system employing a plurality of three way valves and a plurality of apparatuses according to claim 1 wherein the first frequencies used in each of said apparatuses are different so that mutual interference between said plurality of apparatuses is avoided.

4. An apparatus according to claim 1 in which the first and second excitation coupling means comprise coiled electrical conductors adjacent the first and second conduits, respectively.

5. An apparatus according to claim 4 which further comprises flux path means for providing a closed flux path which includes said valve and to which said first and second excitation coupling means can inductively couple.

6. An apparatus according to claim 1 in which the detector means comprises:
    threshold detector means for restoring the resultant signal to the amplitude of the first alternating current signal;
    exclusive "OR" detector means coupled to the threshold detector means and to the signal source means for logically exclusively "OR"ing the restored resultant signal with the first alternating current signal and producing an output signal corresponding thereto, said output signal being related to the relative phase of the resultant signal;

DC reference means for providing a DC reference signal; and comparator means coupled to the exclusive "OR" detector means and to the DC reference means for comparing the DC reference signal to the output signal from the exclusive "OR" detector means and producing an output signal therefrom, said output signal being indicative of the state of the three way valve.

7. An apparatus for monitoring the occlusion of a fluid path linking first and second conduits in a hydraulic system, comprising:

signal source means for provided an electrical excitation signal;

excitation coupling means for coupling the electrical excitation signal from the signal source means to the fluid at a first location in the first conduit;

resultant coupling means for coupling a resultant electrical signal from the fluid at a second location in the second conduit;

electrical reference means for providing an electrical reference signal; and detector means coupled to the resultant coupling means and to the electrical reference means for comparing the phase of the resultant signal to the phase of the reference signal, said comparison being indicative of the occlusion of said fluid path.

8. A method for detecting the state of a valve which links first and second fluid conduits in a hydraulic system, comprising the steps:

providing first and second excitation signals;

coupling the first excitation signal to the fluid at a point "E1" in the first conduit so that the first excitation signal propagates through the fluid;

coupling the second excitation signal to the fluid in the hydraulic system at a point "E2" remote from point "E1" so that the second excitation signal propagates through the fluid;

coupling a resultant signal from the fluid at a point in the second conduit remote from point "E2," said resultant signal being the excitation signals influenced by their propagation through the fluid; and producing from the resultant signal an output signal related to the state of the valve.

9. The method of claim 8 in which the valve is a three way valve controllably linking the second conduit to the first conduit and to a third conduit, the method further comprising the step: coupling the second excitation signal to the fluid in the third conduit.

10. An apparatus for monitoring the occlusion of a fluid path linking first and second conduits in a hydraulic system, comprising:

signal source means for providing an excitation signal;

excitation coupling means for coupling the excitation signal from the signal source means to the fluid at a first location in the first conduit;

resultant coupling means for coupling a resultant signal from the fluid at a second location in the second conduit;

detector means coupled to the resultant coupling means for detecting a characteristic of the resultant signal indicative of the occlusion of said fluid path; and in which at least one of said coupling means comprises means for electromagnetically coupling to the fluid in one of said conduits.

11. The apparatus of claim 10 which further includes flux path means for providing a closed magnetic flux path which includes said fluid path and at least one of said coupling means.

12. An apparatus for monitoring the occlusion of a fluid path linking first and second conduits in a hydraulic system, comprising:

signal source means for providing an excitation signal;

excitation coupling means for coupling the excitation signal from the signal source means to the fluid at a first location in the first conduit;

resultant coupling means for coupling a resultant signal from the fluid at a second location in the second conduit;

detector means coupled to the resultant coupling means for detecting a characteristic of the resultant signal indicative of the occlusion of said fluid path; and in which at least one of said coupling means includes means for electromechanically coupling to the fluid.

13. An apparatus for monitoring the occlusion of a fluid path linking first and second conduits in a hydraulic system, comprising:

signal source means for providing first and second excitation signals;

excitation coupling means including first means for coupling the first excitation signal from the signal source means to the fluid at a location "E1" in the first conduit; and second means for coupling the second excitation signal from the signal source means to the fluid at a location "E2" remote from "E1";

resultant coupling means for coupling a resultant signal from the fluid at a location in the second conduit remote from locations "E1" and "E2"; and detector means coupled to the resultant coupling means for detecting a characteristic of the resultant signal indicative of the occlusion of said fluid path.

14. The apparatus of claim 13 in which:

the fluid path comprises a valve and in which:

the second means couples the second excitation signal to the fluid at a location "E2" in the second conduit; and the resultant coupling means couples the resultant signal from the fluid at a location in the second conduit between location "E2" and the valve.

15. The apparatus of claim 13 in which:

the fluid path comprises a three way valve controllably linking the second conduit to the first conduit and to a third conduit; and the second means couples the second excitation signal to the fluid at a location in the third conduit.

16. The apparatus of claim 13 in which the signal source means includes means for generating first and second excitation signals of differing magnitudes.

17. The apparatus of claim 13 in which the signal source means includes means for generating first and second excitation signals of differing phases.

18. The apparatus of claim 17 which further includes reference means for supplying a reference signal to the detector means and in which the detector means includes means for comparing the resultant signal to the reference signal.

* * * * *